No. 750,934. PATENTED FEB. 2, 1904.
H. J. BENTSON.
TRENCHING MACHINE.
APPLICATION FILED JUNE 11, 1903.
NO MODEL. 11 SHEETS—SHEET 4.
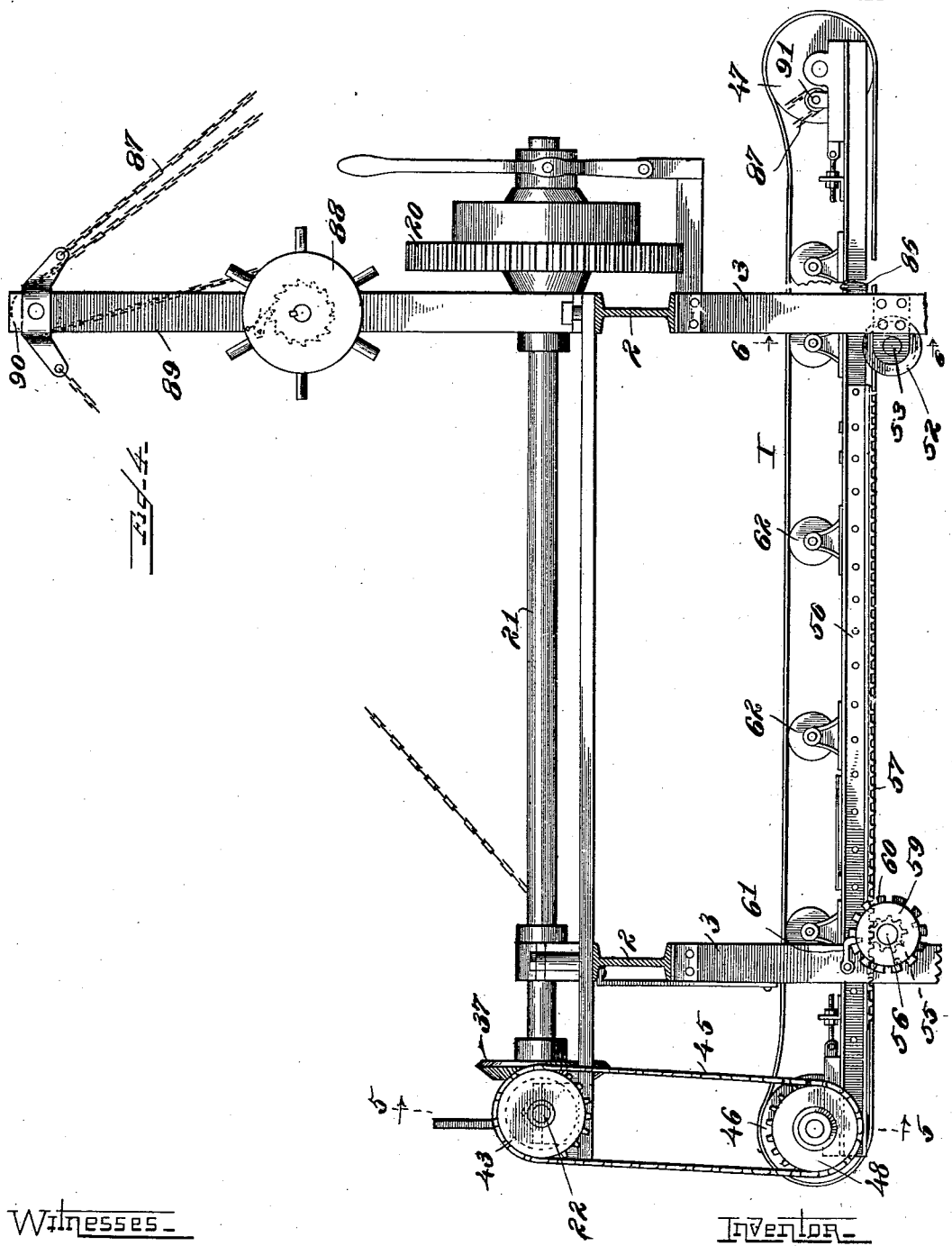

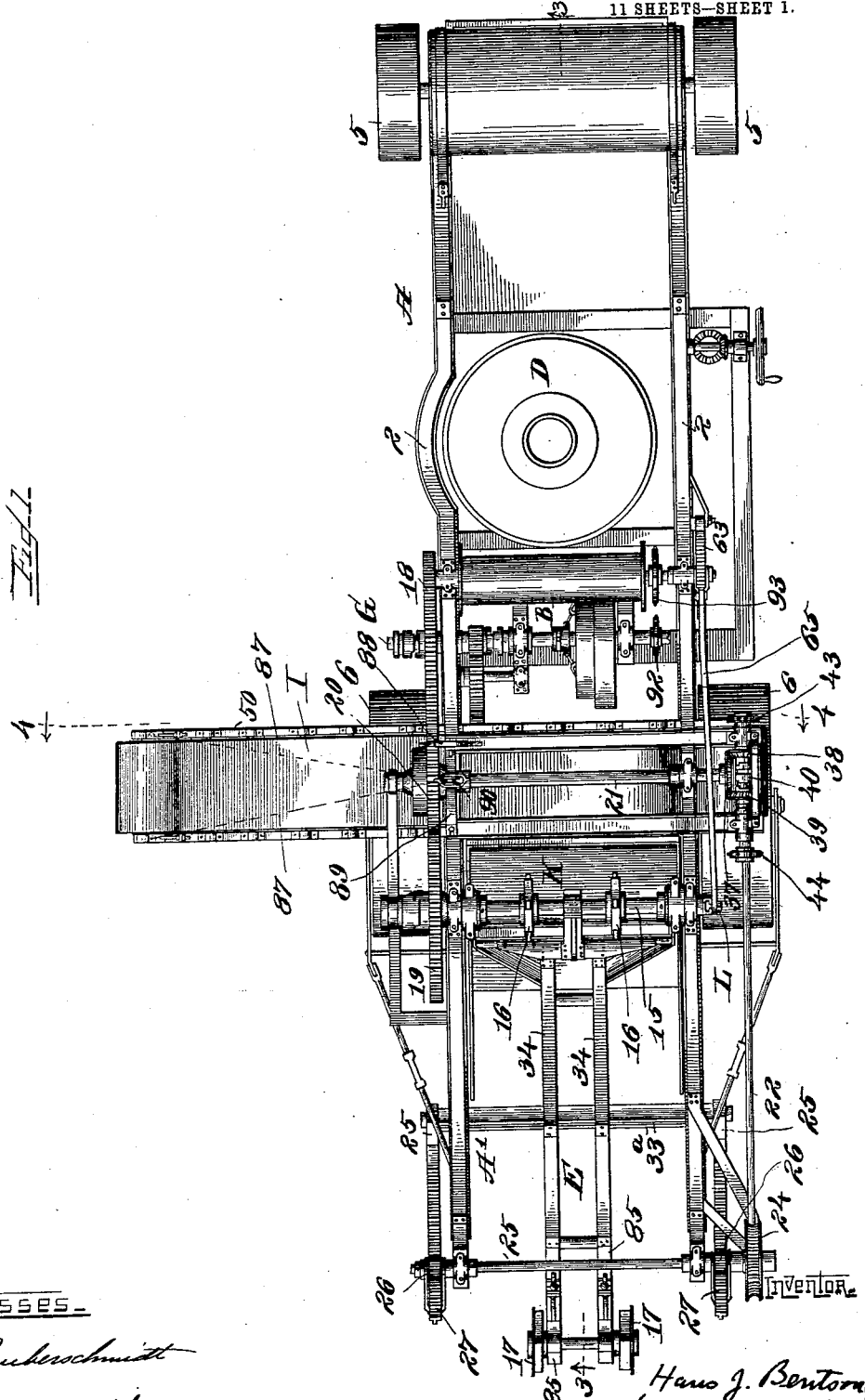

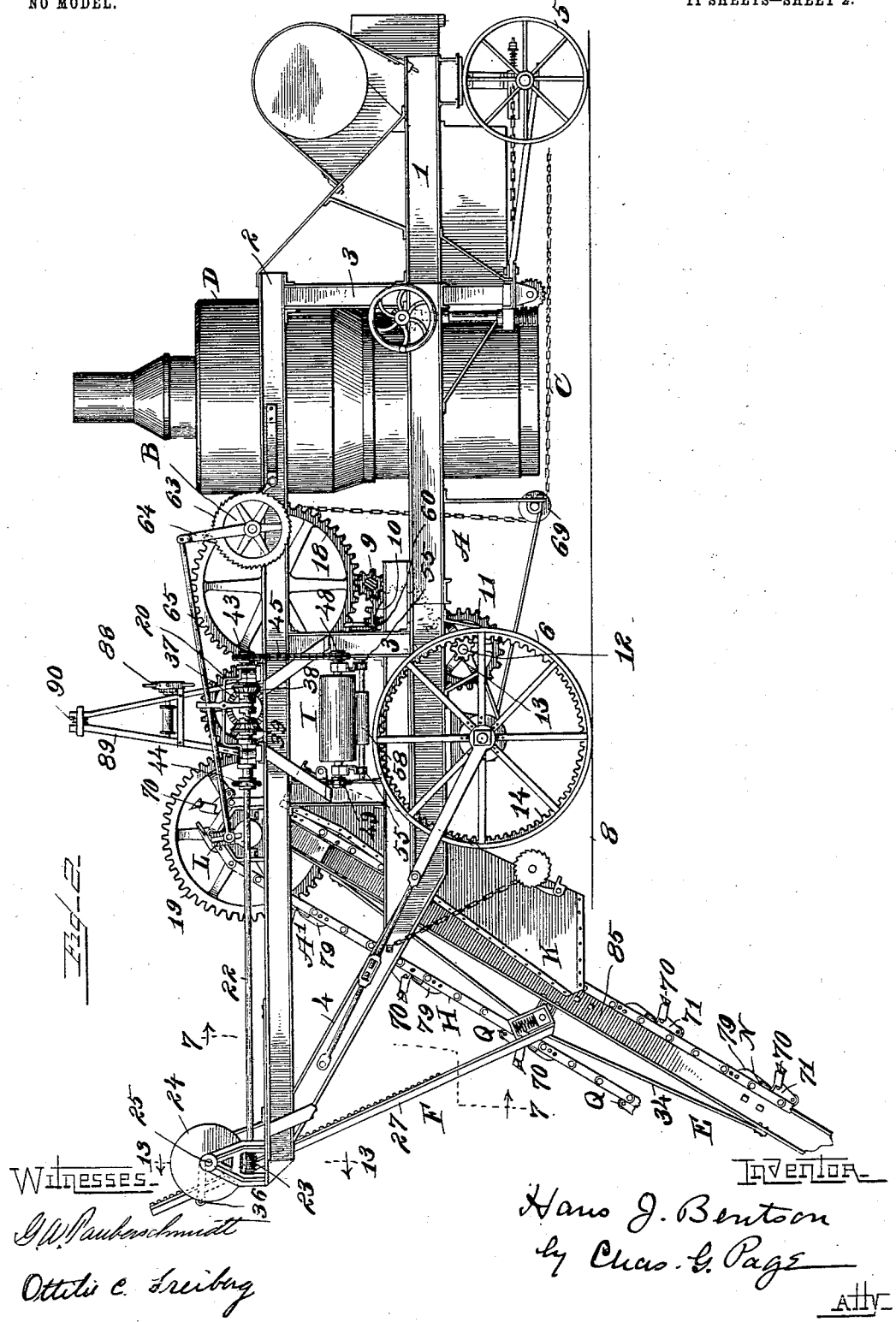

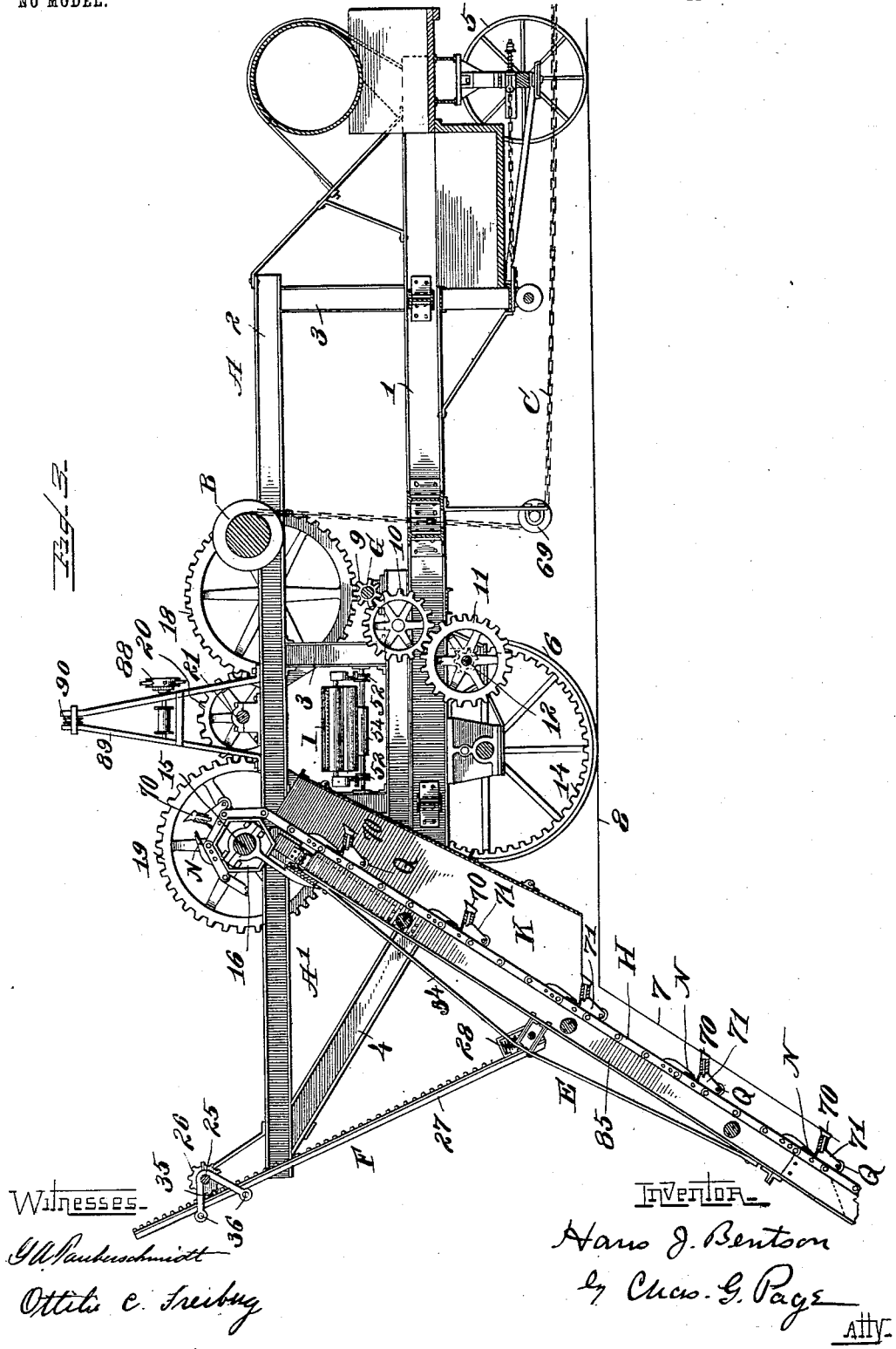

No. 750,934. PATENTED FEB. 2, 1904.
H. J. BENTSON.
TRENCHING MACHINE.
APPLICATION FILED JUNE 11, 1903.
NO MODEL. 11 SHEETS—SHEET 5.
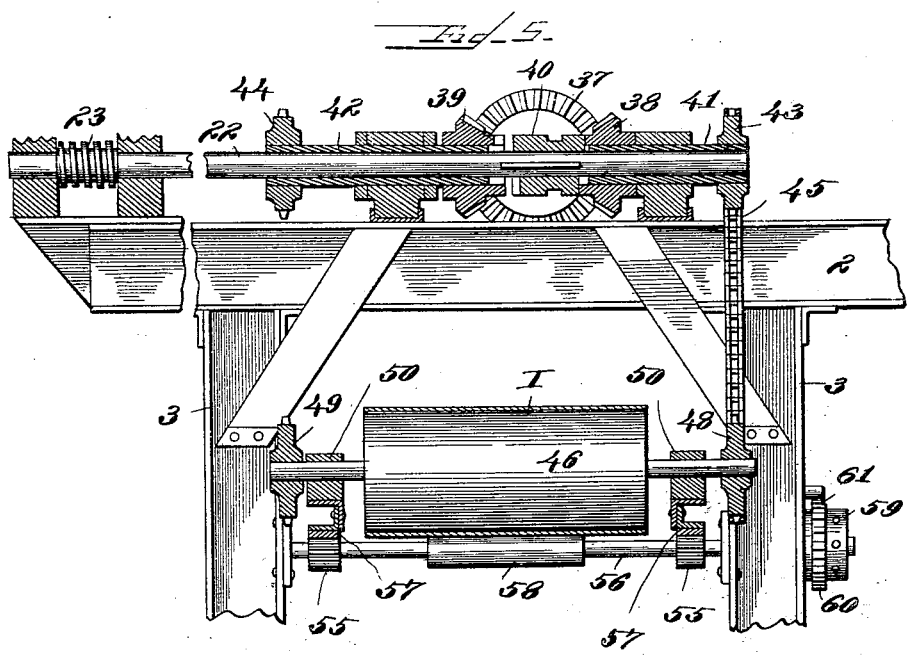
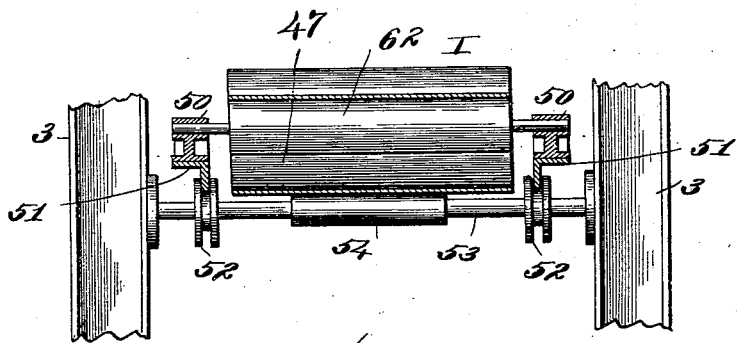
WITNESSES
D. A. Paubenschmidt
Ottilie C. Freiberg
INVENTOR
Hans J. Bentson
by Chas. G. Page
Atty.

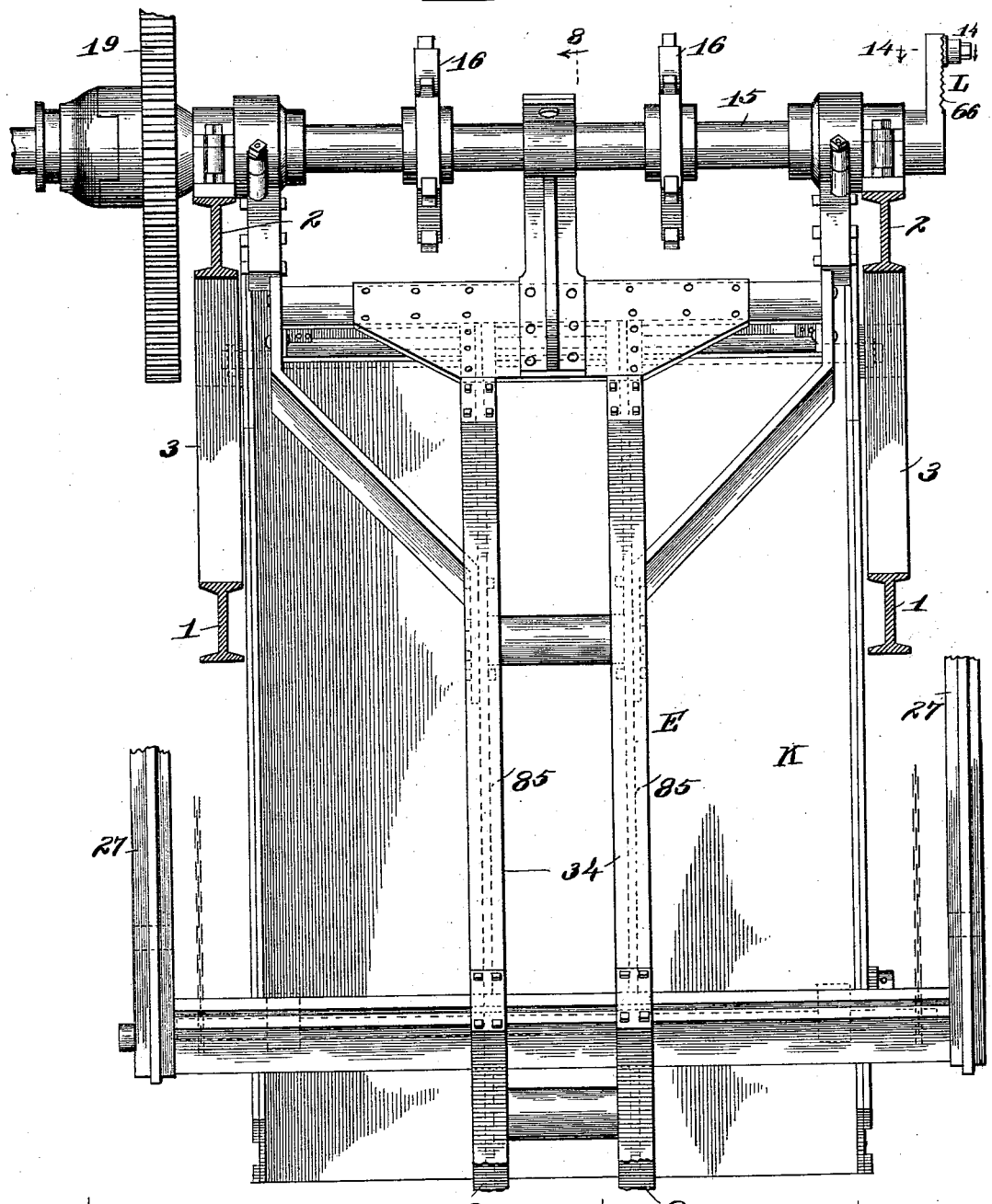

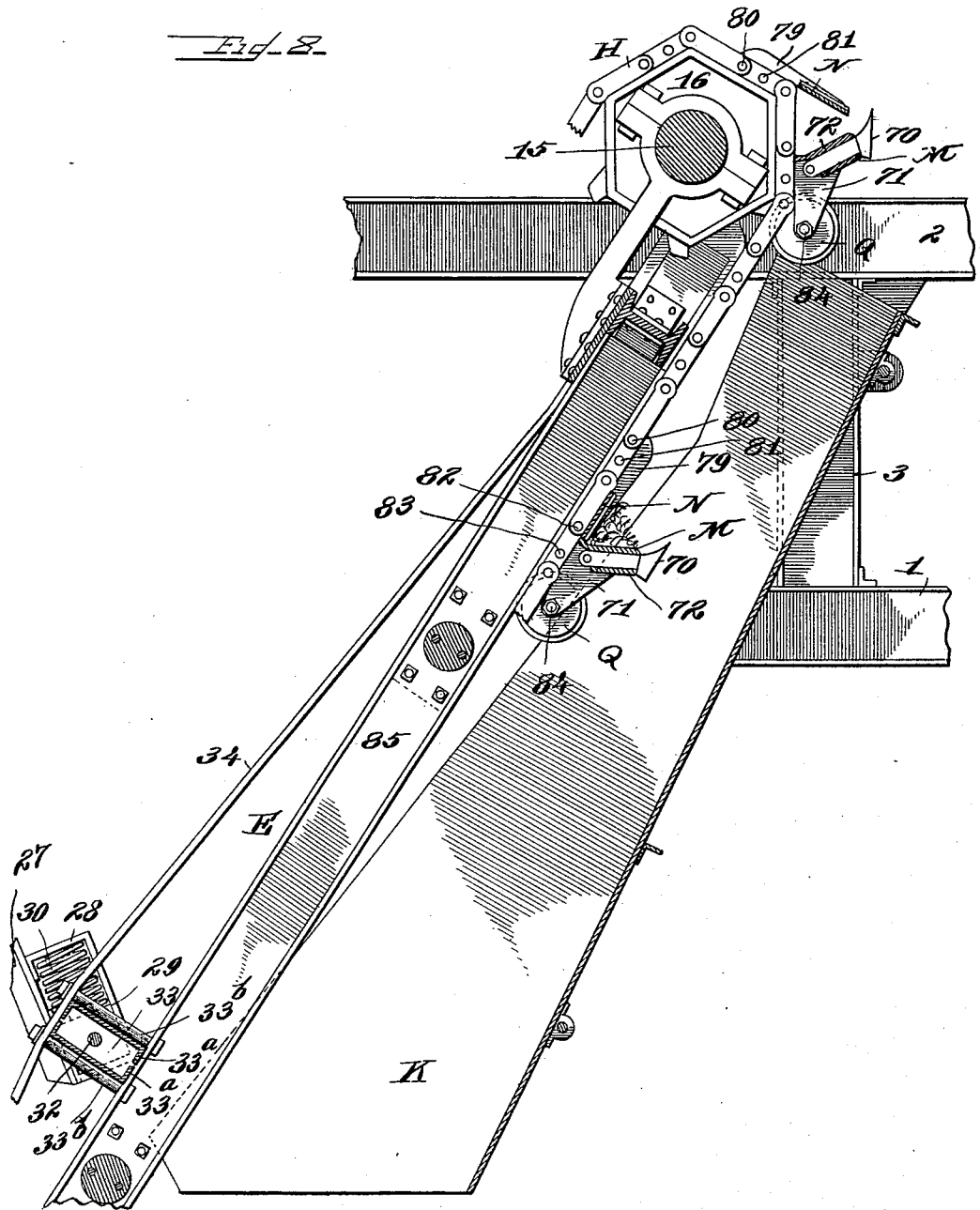

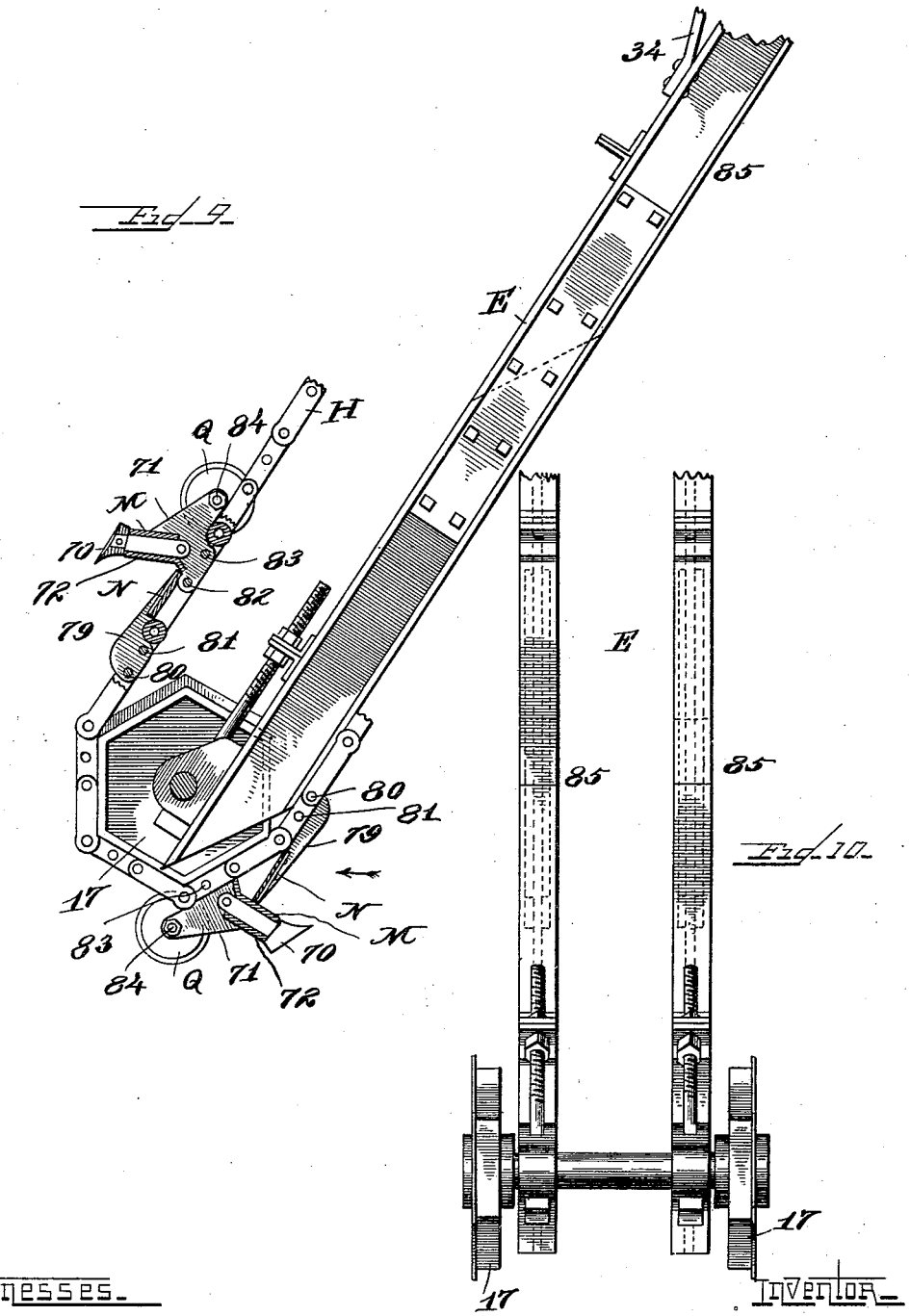

No. 750,934. PATENTED FEB. 2, 1904.
H. J. BENTSON.
TRENCHING MACHINE.
APPLICATION FILED JUNE 11, 1903.
NO MODEL. 11 SHEETS—SHEET 9.
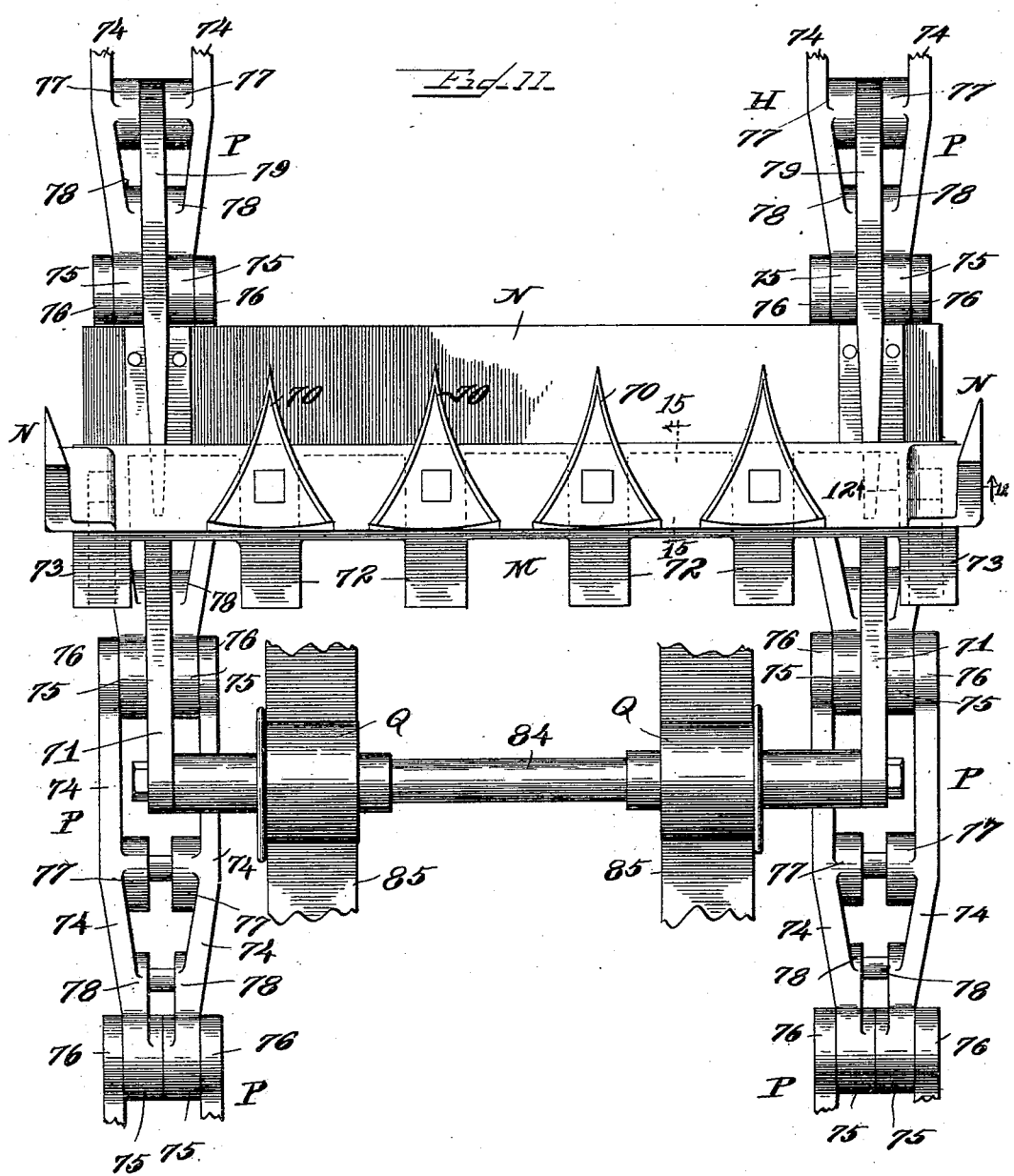

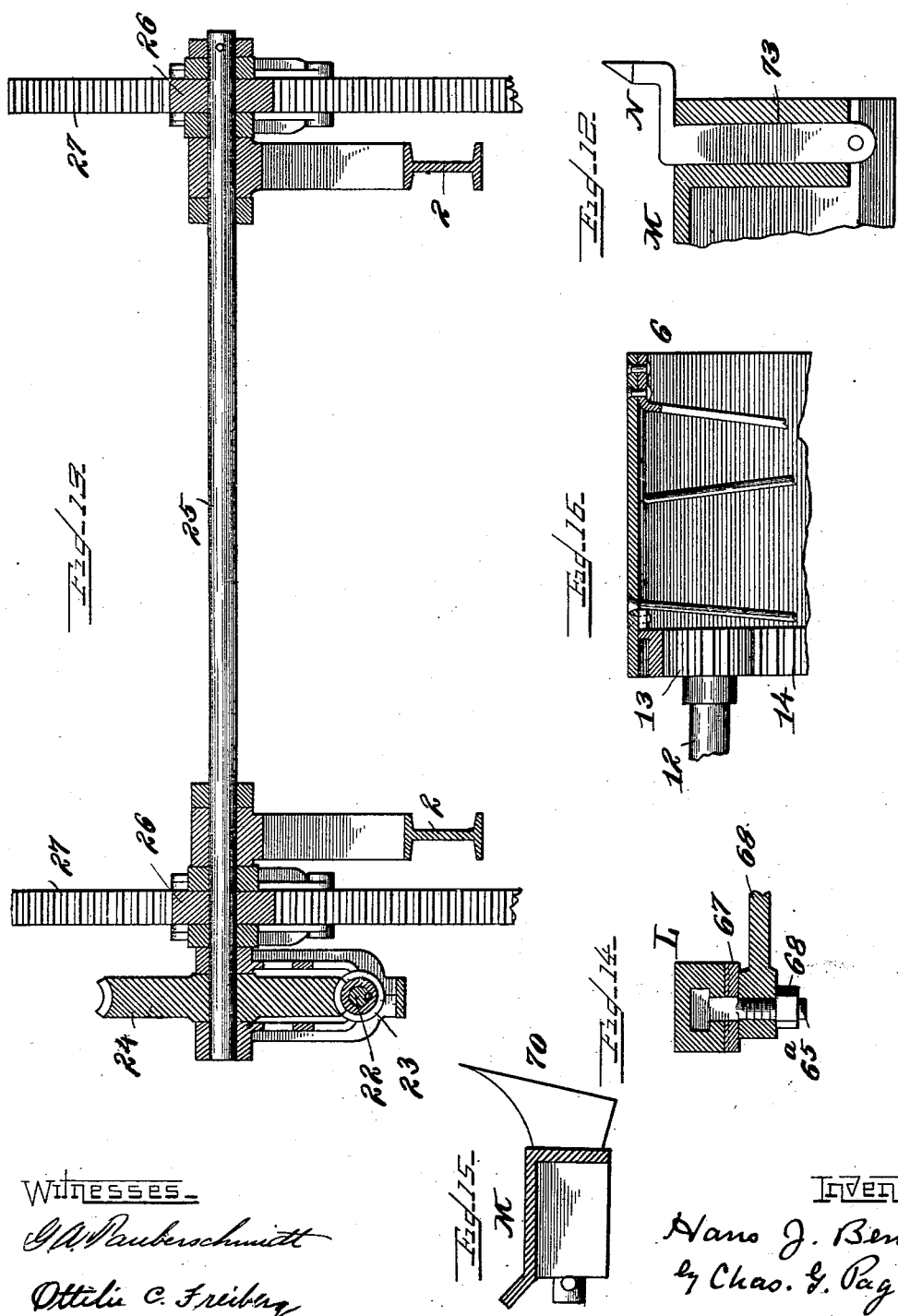

No. 750,934. PATENTED FEB. 2, 1904.
H. J. BENTSON.
TRENCHING MACHINE.
APPLICATION FILED JUNE 11, 1903.
NO MODEL. 11 SHEETS—SHEET 11.
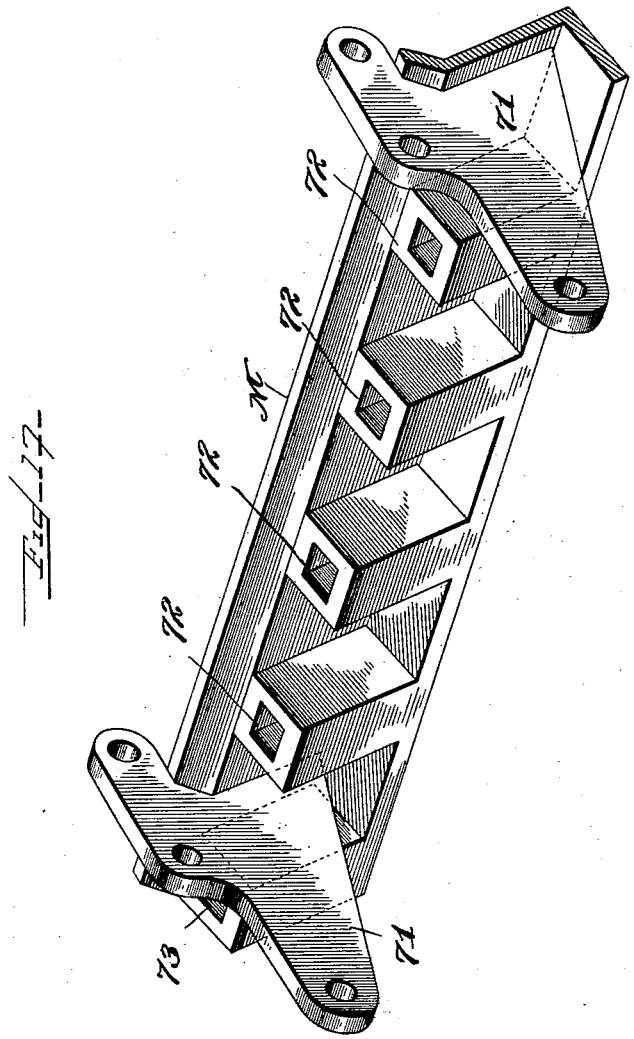
Witnesses
G. A. Rauberschmidt
Ottitio C. Freiberg
Inventor
Hans J Bentson
by Chas. G. Page
Atty No. 750,934. Patented February 2, 1904.

UNITED STATES PATENT OFFICE.

HANS J. BENTSON, OF CHICAGO, ILLINOIS, ASSIGNOR TO FREDERICK C. AUSTIN, OF CHICAGO, ILLINOIS.

TRENCHING-MACHINE.

SPECIFICATION forming part of Letters Patent No. 750,934, dated February 2, 1904.

Application filed June 11, 1903. Serial No. 161,006. (No model.)

*To all whom it may concern:*

Be it known that I, HANS J. BENTSON, a citizen of the United States, residing at Chicago, in the county of Cook and State of Illinois, have invented certain new and useful Improvements in Trenching-Machines, of which the following is a specification.

My invention relates to excavating-machines adapted for digging trenches, and particularly to trenching-machines of the nature illustrated in reissued Letters Patent of the United States, dated July 15, 1902, and numbered 12,010. In said reissued Letters Patent the machine is shown with its rear wheels arranged to straddle a trench which is being extended by the excavating device. I have found in practice that with such arrangement the weight of the machine at opposite sides of the trench frequently causes the side walls of the excavation to cave in.

Objects of my invention are to avoid crushing in the side walls of a trench which is being extended by excavating means comprising a wheeled carriage carrying a long swinging ladder-frame which is hung upon the machine and provided with an endless belt having excavating buckets or shovels attached thereto, to provide a compact, strong, and comparatively light machine which can be propelled as an automobile and which carries a swinging excavator-frame having an endless belt provided with devices for loosening and carrying up the soil and operated from the engine or motor used for propelling the machine, to provide a compact and efficient driving connection between the engine or motor and the rear wheels, to provide a simple and compact arrangement of driving connection between the engine or motor and the endless excavator-belt on the swinging frame, to provide efficient means for raising and lowering the swinging excavator-frame, to adapt the swinging excavator-frame to yield when it encounters an obstruction, to actuate a winding-drum for the warping-chain from the sprocket-shaft which operates the endless belt of the excavating device, whereby the drum will wind up the chain proportionally to the progress of the work, to automatically advance the machine synchronously with and proportional to the work performed by the excavating device, to provide improved means for discharging loose soil at opposite sides of the machine in alternation, to combine mechanisms for operating the raising and lowering device and for actuating the soil-carrying belt, to provide a strong and simple construction of endless belt for the excavating device, and to provide various novel and improved details and matters of combination and arrangement serving to simplify and increase the general efficiency of trenching-machines of the kind or class to which my invention appertains.

In the accompanying drawings, Figure 1 is a top plan view of a trenching-machine embodying the principles of my invention, the engine or motor employed being removed for convenience of illustration and a portion of the rotary shaft G, which may be regarded as the engine or motor shaft, being also for convenience of illustration partially broken away. In this view the endless belt of the excavating device is also removed. Fig. 2 illustrates the machine in side elevation with a portion of the excavating device broken away for convenience of illustration. Fig. 3 is a central longitudinal section through the machine on a vertical plane, a portion of the excavating device being broken away for convenience of illustration. Fig. 4 is a sectional elevation of a portion of the machine, the plane of the section being indicated by line 4 4 in Fig. 1. Fig. 5 is a sectional elevation of a portion of the machine, the plane of the section being indicated by line 5 5 in Fig. 4. Fig. 6 is a sectional detail on line 6 6 in Fig. 4. Fig. 7 is a sectional plane of a portion of the excavating device, the section being indicated by line 7 7 in Fig. 2. In this view parts of certain members are broken away for convenience of illustration and the endless belt of the excavating device is removed. Fig. 8 is a sectional elevation of a part of the excavating device with a portion of the belt therefor in place, the plane of the section being indicated by line 8 8 in Fig. 7. Fig. 9 is a view similar to Fig. 8, but showing only the lower or rear portion of the excavating device. Fig.

10 is a front elevation of the portion of the excavating device shown in Fig. 9 with the belt removed. Fig. 11 is an enlarged view of a portion of the endless belt and its adjuncts of the excavating device. Fig. 12 is a detail section on line 12 12 in Fig. 11. Fig. 13 is a detail section on line 13 13 in Fig. 2. Fig. 14 is an enlarged sectional detail on line 14 14 in Fig. 7. Fig. 15 is a detail section on line 15 15 in Fig. 11. Fig. 16 is a sectional detail of a portion of one of the rear propelling-wheels. Fig. 17 shows in perspective one of the transverse angle-plates of the endless belt of the excavating device.

The operating members of the machine are supported upon a wheeled carriage A, having a suitable motor or engine and driving mechanism, whereby it can be propelled as an automobile from place to place, the motor or engine being also employed to operate a winding-drum B, from which a chain or cable C, Fig. 3, can be extended to and connected with some temporary fixture positioned ahead of the machine, so as to progressively warp or advance the machine as the work of forming a trench progresses. As the engine or motor can be of any suitable type, representation of the same is omitted. Figs. 1 and 2 illustrate, however, a boiler D, supported upon the carriage at a point forward of the rear wheels, and where a boiler is thus employed a steam-engine of suitable construction is associated therewith and supported upon the carriage. It is understood, however, that the engine or motor and adjuncts thus arranged at a point forward of the rear wheels may be of any other desired type suitable for propelling the machine and for actuating the operating mechanisms thereof.

The carriage frame or body is constructed with lower longitudinally-arranged side bars 1, Figs. 2 and 3, and upper longitudinally-arranged side bars 2. The lower side bars are suitably connected by cross-bars, and the upper side bars are similarly secured together. The upper side bars are also supported upon and secured to the lower side bars by relatively short upright bars 3 at suitable intervals along the structure. The upper side bars 2 are longer than the lower side bars 1 and are arranged to extend rearwardly beyond the rear terminals of the lower side bars 1, and with this desired arrangement the rear ends of the lower side bars are rigidly connected with the rear ends of the upper side bars by inclined brace-bars 4, which incline upwardly and rearwardly from the lower side bars. The frame or body thus constructed is supported by front steering-wheels 5 and rear propelling-wheels 6. The rear propelling-wheels 6 are arranged forward of the rear ends of the lower side bars, whereby the frame or body has in rear of these propelling-wheels an angular rear extension A', involving the rear end portions of the upper side bars 2 and the inclined brace-bars 4. This rear extension of the body-frame forms a strong, compact, and comparatively light structure arranged to overhang a trench which is being extended in length by the excavating device when the machine is at work, as in Fig. 3. This rear extension A' of the body-frame forms a support for a device F, employed for raising and lowering the long swinging excavator or ladder frame E, which is pivotally hung at its forward end upon the body-frame at a point which will be forward of the forward end wall of a trench, into which the excavating-frame is dipped, as in Fig. 3, for the purpose of permitting the excavating devices to operate upon such end wall of the trench. This arrangement also permits the raising and lowering device F to be supported and fulcrumed back of the point at which the excavator-frame E is hung and to connect with such swinging excavator-frame at a point sufficiently in rear of the forward hinged end thereof to secure ample leverage, and thereby facilitate the operation of raising and lowering said swinging frame.

The construction described also places the weight of the machine considerably forward of the adjacent end of a trench which is being formed by the excavating devices, and thereby avoids throwing any of the weight of the machine upon the ground at either side of the trench, whereby caving in of the trench-walls as a result of the presence of the machine is entirely avoided. This is illustrated by Fig. 3, in which the machine is shown with the excavating-frame dipped into a trench and the excavating devices at work upon the end wall or bank 7 of the same, the rear supporting and propelling wheels 6 of the machine being upon the unbroken ground 8 at points considerably ahead of the end of the trench and the rear extension of the body-frame being projected back of such end of the trench, so as to overhang the trench and support the raising and lowering device F at a desirable point.

The rear propelling-wheels 6 are gear-connected with and driven from a transversely-arranged rotary driving-shaft G, which is supported upon the body-frame at a point forward of such wheels and operated by the engine or motor employed. Gear connection between the driving-shaft G and the rear propelling-wheel is best illustrated in Figs. 2 and 3, in which a pinion 9 on the driving-shaft engages a spur-wheel 10, mounted upon the body-frame and engaging a second spur-wheel 11 on a transversely-arranged rotary shaft 12, which is supported by the body-frame and provided with gears or pinions 13, arranged to engage gear-teeth or ring gears 14 on the inner rim portions of the propelling-wheels. By this arrangement the driving power is applied to both of the rear propelling-wheels, and by thus applying it to the peripheral portions of such wheels sufficient leverage for propelling the machine is secured.

The excavator-frame is hung to swing about the axis of a rotary shaft 15, arranged transverse to the length of the body-frame and supported upon the upper side bars of such body-frame at a point over the horizontal rear end portions of the lower side bars, it being observed that the inclined brace-bars 4 are practically upwardly and rearwardly inclined extensions of such lower side bars and that the shaft 15 is located at a point at or near the point of junction between the main portion of the body-frame and its rear angular extension A', which supports the raising and lowering device F. The devices for loosening and elevating the soil are attached to an endless belt H, which is arranged to traverse the swinging excavator-frame and trained over sprockets 16 and 17, respectively, at the upper and lower ends of the excavator-frame, the upper sprockets 16 being secured upon the rotary shaft 15, about which the excavator-frame is arranged to swing. The rotary shaft 15, which thus serves to operate the endless excavator-belt, is also driven from shaft G. The driving connection between these two shafts comprises a gear or spur 18, which is engaged and driven by pinion 9 on the engine-shaft G, a gear 19 on the shaft 15, and an intermediate gear 20, which in addition to its function as a power-transmitting connection between the gears 18 and 19 also serves to actuate mechanisms for raising and lowering the excavator-frame and for operating a belt arranged for side delivery. To such end the said intermediate gear 20 is secured upon one end portion of a transversely-arranged rotary shaft 21, which is supported upon the body-frame, and provided at its opposite end portion with a bevel-gear 37, Fig. 4, from which power can be taken by a right-and-left clutch device for operating in either direction a longitudinally-arranged rotary shaft or rod 22. This rotary shaft or rod 22 extends rearwardly from the right-and-left clutch device and is provided at its rear end with a worm 23, (see also Figs. 5 and 13,) which engages a worm-wheel 24 on a transversely-arranged rotary shaft 25. The rotary shaft 25 thus provided with the worm-wheel is mounted upon the body-frame and further provided with pinions 26, Fig. 13, which engage rack-bars 27, comprised in the raising and lowering device E. These rack-bars 27 connect with the conveyer-frame at points sufficiently back from the forward pivotally-supported end of such frame to secure the advantage of suitable leverage and incline upwardly and rearwardly from the conveyer-frame when the latter dips or extends downwardly into the trench and is in working position, as in Figs. 2 and 3. This arrangement is attained by forming the body-frame of the carriage with the hereinbefore-described rear extension back of the point at which the excavator-frame is hung, and thereby permitting the worm-wheels 24, which are mounted upon such rear extension, to be set back at points somewhat remote from the shaft 15, about which the excavator-frame is arranged to swing. By thus positioning the worm-wheels 24 the rack-bars can swing about the axes of the worm-wheels and also move longitudinally to an extent to permit the excavator-frame to be folded up when not in use—that is to say, the excavator-frame can be swung from the inclined working position (shown in Figs. 2 and 3) upwardly to a nearly horizontal carrying position, such operation being effected by actuating the worm-wheels so as to longitudinally shift the rack-bars, which will have a combined longitudinally shifting and swinging movement. The lower ends of these rack-bars are spring-connected with the excavator-frame, as best shown in Fig. 8, in which the lower end of one of the rack-bars is provided with a housing 28, inclosing a slide 29 (see also Fig. 2) and having a spring 30 confined between the slide and the upper end of the housing, the slides being pivotally attached, as by journals or pivots 32, to blocks or bearings 33, which are clamped between a pair of transversely-arranged angle-bars 33ᵃ on the swinging excavator-frame. These angle-bars are in turn clamped upon the excavator-frame by truss-bars 34 and confined between tie-bolts 33ᵇ, which serve to tie the middle portions of the truss-bars to the excavator-frame.

The rack-bars 27 are guided and maintained in engagement with the pinions 26 on shaft 25 by swinging yokes 35, hung to swing about the axis of such shaft and having antifriction-rolls 36, which engage the plane rear sides of the rack-bars—for example, as in Fig. 3, which illustrates the arrangement of one of these swinging yokes. The swinging rack-bars have therefore, in effect, a shifting connection with a fulcrum upon the rear end of the rear extension of the body-frame and are held against longitudinal shift by the pinions 26 when the latter are held against rotation. If, however, the excavating devices at the lower end of the swinging excavator-frame encounter an obstruction, such as a stone or stump, the springs 30 will permit such frame to yield, so as to prevent breakage, it being seen that although the rack-bars may be held against upward end movement the excavator-frame can swing upwardly to an extent proportional to the extent to which its upward swing independent of the swinging and lowering bars can compress the springs 30 between the slides 29 and the upper ends of the housings 28.

The right and left clutch device for operating the rotary worm shaft or rod 22 is best shown in Fig. 5, in which the bevel-gear 37 (shown in Fig. 1 on the transverse rotary shaft 21) is positioned opposite and arranged to engage a couple of bevel-gears 38 and 39, which are driven continuously from shaft 21 by reason of their engagement with the bevel-gear 37 on said shaft. The double clutch member 40 is splined or keyed to rotate with and slide longitudinally upon the worm-shaft 22 and can be adjusted thereon to engage the gears 38 and 39 in alternation, in accordance with the desired direction of rotation of the worm-shaft, it being observed that these gears 38 and 39 are also adapted to form clutch members or clutch portions opposite the ends of the intermediate shifting clutch member 40. This mechanism is also adapted for transmitting power to devices employed to actuate a transversely-arranged conveyer-belt arranged to receive loose soil from the excavating devices and discharge the same at one or the other side of the machine. To such end the gears 38 and 39 are respectively secured upon sleeves 41 and 42, which are arranged loose upon the rotary worm-shaft 22, the sleeve 41 being provided with a sprocket 43 and the sleeve 42 being provided with a sprocket 44. These sprockets 43 and 44 can be alternately used to operate a link belt 45, which can be transferred from one sprocket to the other in accordance with the direction in which it is desired to operate the transversely-arranged conveyer-belt I, which passes about a couple of belt-rolls 46 and 47, as in Fig. 4. In Fig. 5 the belt-roll 46 has its axle ends or journals respectively provided with sprockets 48 and 49, the driving chain or belt 45 being in such figure arranged to connect the sprockets 43 and 48. When, however, it is desired to drive the conveyer-belt in an opposite direction, the chain or belt 45 can be transferred to the sprockets 44 and 49, and in this way the ultimate discharge of loose soil can be effected at either side of the machine, as may be desired.

The conveyer-belt I, Fig. 4, is arranged to pass about the belt-rolls 46 and 47, which are in turn mounted upon the conveyer-frame 50. This conveyer-frame 50 is arranged for longitudinal adjustment in directions transverse to the length of the body-frame, and to such end it is constructed with angle-iron side bars 51, Fig. 6, which are at one side of the machine supported by grooved rolls 52 on a transversely-arranged revoluble shaft 53. This shaft is in turn supported upon the body-frame of the carriage, and is also preferably provided with a long roll 54, arranged to prevent the lower leaf of the conveyer-belt from sagging. The conveyer-frame is also supported and adjusted by pinions 55, Fig. 5, on a transversely-arranged rotary shaft 56, the side bars 50 of the conveyer-frame being provided with racks 57, which bear upon and mesh with the supporting and adjusting pinions 55. The shaft 56 is parallel with the shaft 53, Fig. 6, and is likewise supported upon the body-frame and provided with a long belt-roll 58 for upholding the lower leaf of the conveyer-belt. In order to operate the shaft 56 for the purpose of adjusting the conveyer-frame, it is provided with a spanner-hub 59, having sockets or openings for a spanner-tool, and as a means for locking it against rotation it is provided with a ratchet 60, which can be engaged by a locking-pawl 61. The side bars of the conveyer-frame are provided with idler-rolls 62, arranged to uphold the upper leaf of the conveyer-belt, and the belt-rolls 46 and 47 are mounted upon adjustable bearings, whereby the tension of the conveyer-belt can be regulated.

When the machine is at work, the soil is loosened by the excavating devices and carried up to a point where it is discharged into the transversely-arranged conveyer-belt, and to prevent the soil thus carried up from spilling into the ground at a point directly in advance of the trench an inclined apron or trough K is supported upon the body-frame in advance of the excavator-frame, Figs. 2 and 3. As the work progresses the machine is slowly warped or advanced at a rate of speed proportional to the progress of the work, and to such end the rotary drum B, which is used to wind up the warping-chain C in order to thus advance the machine, is actuated from the rotary shaft 15, upon which the upper sprockets for the excavator-belt are secured. For this purpose the rotary shaft 15 (see Figs. 1, 2, and 7) is provided with a crank L, which is connected with the winding-drum B by a step-by-step movement comprising a ratchet 63, secured upon one of the axle ends or journals of the winding-drum, and a vibratory arm 64, having a pawl for engaging the ratchet 63 and connected with the crank L by a pitman 65, the vibratory arm being loosely mounted upon the axle end or journal of the winding-drum or otherwise supported, so as to vibrate about the axis of the said drum. In order to vary the speed at which the machine is thus advanced, the connection between the pitman 65 and the crank L is adjustable toward and away from the axis about which the crank revolves—as, for example, the crank-arm is slotted longitudinally to receive and permit the lateral adjustment of a bolt $65^a$, which forms the crank-pin, Fig. 14, and one side of the crank-arm is serrated, as at 66, Fig. 7, so as to engage with the correspondingly-serrated face of a plate or washer 67, through which the crank-pin extends. This locking plate or washer is arranged between the crank and the pitman, and the latter is confined between such plate or washer and a nut 68 on the outer threaded end of the crank-pin. After loosening or removing the nut 68 the locking-plate can of course be adjusted upon the crank, and this will necessarily adjust the crank-pin. The chain C passes downwardly from the winding-drum to and about a pulley 69 on the body-frame and thence forwardly to any desired extent.

With further reference to the excavating devices rotary shaft 15, about which the excavator-frame is arranged to swing, is supported on a level above the axle of the rear propelling-wheels and at a point to the rear of such axle, so that while the excavator-frame can dip down into the trench, as in Figs. 2 and 3, and permit the excavating devices to operate upon the bank 7 at an end of such trench the rear supporting and propelling wheels 6 will be upon the ground at a point sufficiently ahead of such end of the trench to avoid caving in of the walls of the trench as an incident to the weight of the machine upon the ground, it being a fact that where the rear wheels straddle the trench such caving in of the walls is of frequent occurrence, and that to construct a machine with the rear wheels spread apart to an extent to place them sufficiently remote from the side walls of the trench to avoid caving in would not be a practical matter.

The excavator-belt, which is trained over sprockets at opposite ends of the excavator-frame, comprises two endless chains each constructed with a series of hinged links and a series of cross-plates M, Figs. 11, 15, and 17, to which the blades 70 of the excavating devices are attached. The belt is also provided with wipers or ejectors N, which automatically free the plates M and the blades from the loose soil at a point suitable for discharging the soil into the transversely-arranged conveyer-belt. The plates M are each an angle-plate provided near its ends with the end plate 71, Fig. 17, and provided between such end plates with sockets 72, in which the shank portions of the blades or cutters 70 are fitted and removably secured, as shown in Figs. 8 and 9. The end plates 71 are arranged in planes at right angles to the angle-plate M and each provided with a set of bolt-holes, and the plate M is extended beyond these plates 71 to provide end portions each having a socket 73 (one of which is shown in Fig. 17) corresponding with the sockets 72 and adapted to receive the stem of a cutter N, (see also Figs. 11 and 12,) arranged for shaving a side wall of the trench. The endless belt comprises a pair of parallel endless chains each composed of a series of links P, as best shown in Fig. 11, wherein each link is formed by a pair of parallel side plates 74, having at one end of each pair a couple of perforated hub or bearing portions 75, which are fitted together, the opposite ends 76 of such pair of side plates being separated to receive the end bearing portions of the plates 74 forming the next link, and so on. The side plates of each link are also provided with perforated bearing portions 77 and 78 at points between their ends for bolts or pivots used in attaching the angle-plates M and the scrapers N. By such arrangement the links can all be of uniform construction, whereby they can be readily assembled to form an endless chain, to which the angle-plates M and the scraper-plates N are secured at intervals—as, for example, in the following way: Each scraper-plate N is arranged in advance of a transverse series of cutters 70 and is secured to a pair of arms or plates 79, which are in turn rigidly secured to two oppositely-arranged links P of the two chains by bolts 80 81, Fig. 9, inserted through the perforated bearing portions 77 and 79, Fig. 11, of said two links. In this way each scraper-plate thus rigidly secured to a pair of links will lie flatwise upon the next succeeding pair of links when such portion of the belt is straight and will swing outwardly when said portion of the belt is bent, as in passing about one of the polygonal sprockets, thereby freeing the angle-plates and cutters thereon from soil which has been carried by the angle-plates to the point of discharge. In like manner each angle-plate M, which practically constitutes a bucket or shovel having a portion thereof normally formed by a scraper-plate or ejector N, is rigidly bolted to a pair of oppositely-arranged links P by bolts 82 83, Fig. 9, passing through the perforated bearings 77 and 78 of such links, Fig. 11, and as thus arranged the plates 71 project back of the links to which they are attached, so as to form arms, which extend over het next succeeding pair of links and form arms for a transversely-arranged rod 84, carrying antifriction-rolls Q, which bear against and traverse longitudinal bars 85 of the swinging excavator-frame.

During operation the endless belt carrying the excavating devices is operated from the engine or motor, and these excavating devices serve to loosen the soil and carry the loose soil up to a point where it is automatically ejected from the shovels or buckets by the scrapers. This discharge takes place at a point where the soil will fall upon the transversely-arranged delivery belt or apron I, which, as illustrated in Figs. 4 and 5, can be adjusted and operated so as to discharge at either side of the machine, the rack-and-pinion devices for thus longitudinally adjusting the said transversely-arranged conveyer-frame being hereinbefore described. In Fig. 4 the said transverse conveyer-frame is positioned for discharge at one side of the machine, with the link belt 45 connecting the sprockets 43 and 48. When, however, this conveyer-frame is shifted to the left, Fig. 4, and the link belt is shifted from sprockets 43 and 48 to sprockets 44 and 49, Fig. 5, so as to reversely drive the belt I, the link belt or chain 45 must of course be lengthened or a longer link belt substituted therefor.

The end portion of the transversely-arranged conveyer-frame (shown in Fig. 4) is hinged, as at 86, whereby its angle can be varied. In order to thus swing such end portion of the conveyer-frame, I employ a raising-andlowering chain or cable 87, which for convenience of illustration is shown partially broken away. This chain 87 connects with a winding-drum 88 upon a standard 89 on the body-frame of the machine, and from such winding-drum it passes over a pulley 90 (shown in dotted lines) at the upper end of the standard 89. From pulley 90 the chain passes down to and under a pulley 91 on the transverse conveyer-frame and thence up to the upper end of standard 89, to which it is secured. When the transverse conveyer-frame is shifted for discharge, at the left of Fig. 4, the standard 89 can be unbolted and changed to the left side of the body-frame shown, it being understood that in practice each end portion of the transverse conveyer-frame can be hinged to the main middle portion thereof and that the end portion whereat the delivery takes place can be set at any desired angle by means such as described.

In the construction shown the axes of the winding-drum B and the rotary shafts 15 and 21 are relatively parallel and arranged transverse to the length of the machine, thereby permitting a comparatively simple and compact arrangement, while the worm-shaft 22, which extends alongside the rear extension A' of the body-frame and which is operated from the rotary shaft 21, is parallel with the length of the body-frame.

When it is desired to quickly wind up the warping-chain C, a conveyer-belt can be applied to sprockets 92 and 93, Fig. 1, respectively on the engine-shaft G and the winding-drum B, and in such case the pawl 64, Fig. 2, can be swung into position away from the ratchet 63 of the step-by-step mechanism usually employed for operating the winding-drum.

When the machine is at work, the excavator-frame dips into the trench and is usually maintained at an angle of about thirty degrees; but whether it is thus or more or less inclined it will hang back of the rear wheels 6, so that the latter can bear upon the solid ground forward of the end wall 7 of the trench. The transverse axis about which the excavator-frame is hung is positioned in a horizontal plane above the plane of the axis of the rear wheels 6, so that while shaft 15 can be mounted upon the body-frame above and not far back of a vertical line intersecting the axis of the rear wheels the conveyer-frame can hang in position approaching a vertical plane and at the same time permit the rear wheels to run considerably ahead of end 7 of the trench, it being observed that if shaft 15 is set lower down the excavator-frame must either hang farther away from such vertical plane unless said shaft is also set farther back on the rear extension of the body-frame.

What I claim as my invention is—

1. In a trenching-machine, a wheeled carriage provided with an engine or motor; an excavating device adapted for forming a trench; power-actuated mechanism for operating the excavating device; a chain or cable for warping the carriage; a rotary drum for winding up the chain or cable; and power-actuated means adapted for operating the drum in a direction to wind up the chain or cable and comprising a ratchet, a reciprocating pawl-carrier provided with a pawl which engages and actuates the ratchet with a step-by-step movement, and power-actuated mechanism operated synchronously with the mechanism for operating the excavating device and applied to operate the reciprocating pawl-carrier and effect a progressive warping of the carriage proportional to the progress of the excavating device in forming a trench.

2. In a trenching-machine, a wheeled carriage provided with an engine or motor; an excavating device adapted for forming a trench and constructed with a swinging ladder-frame, an endless belt provided with devices for loosening and carrying up the soil, and trained over sprockets at opposite ends of the ladder-frame; operating mechanism connecting the engine or motor with the belt-sprocket at the forward end of the ladder-frame; a chain or cable for warping the carriage as the work of forming a trench progresses; a drum for winding up the chain or cable; means for operating the winding-drum comprising a ratchet, a reciprocating pawl-carrier provided with a pawl which engages and operates the ratchet with a step-by-step movement, and power-actuated mechanism applied for operating the reciprocating pawl-carrier and actuated synchronously with the operation of the endless belt of the excavating device.

3. In a trenching-machine, a wheeled carriage; an excavating device constructed with a swinging ladder-frame and an endless belt provided with devices for loosening and elevating the soil, and trained over sprockets at opposite ends of the swinging ladder-frame; a chain or cable for warping the carriage as the work of forming a trench progresses; a winding-drum for the chain or cable; means adapted for operating the winding-drum with a step-by-step movement and comprising a ratchet, and a reciprocating pawl-carrier provided with a pawl which engages and actuates the ratchet; a crank mounted and operated to revolve with the belt-sprocket at the upper end of the swinging ladder-frame, and power-transmitting connection between the crank and the reciprocating pawl-carrier.

4. In a trenching-machine, a wheeled carriage; an excavating device adapted for operating upon the wall at an end of a trench; a chain or cable for warping the carriage as the work of trenching progresses; a drum for winding up the chain or cable; means for actuating the drum comprising a ratchet, and a pivotally-supported reciprocating pawl-carrier provided with a pawl for engaging and operating the ratchet with a step-by-step movement, a crank which operates synchronously with the operation of the excavator in trenching, and a pitman connecting the crank with the reciprocating pawl-carrier.

5. In a trenching-machine, a wheeled carriage provided with an engine or motor; an excavating device comprising a ladder-frame hung at the rear portion of the carriage, and an endless belt provided with devices for loosening and carrying up the soil, and trained over sprockets at opposite ends of the swinging ladder-frame; a crank secured upon a rotary power-driven shaft whereon the sprocket at the forward end of the swinging ladder-frame is fixed; a winding-drum; a ratchet for operating the winding-drum; a reciprocating pawl-carrier provided with a pawl for engaging and actuating the ratchet; a pitman connecting the said crank with the reciprocating pawl-carrier; and a chain or cable connected with the winding-drum for warping the carriage.

6. In a trenching-machine, a wheeled carriage provided with an engine or motor; an excavating device adapted for trenching and operated from the engine or motor; a chain or cable for warping the carriage; a drum for winding up the chain or cable; and means for operating the winding-drum comprising a ratchet, a reciprocating pawl-carrier provided with a pawl which can engage the ratchet for operating the same with a step-by-step movement and which can be swung out of engagement with the ratchet; the winding-drum being provided with a sprocket whereby belt connection can be made between the engine or motor and the winding-drum when it is desired to wind up the chain or cable more rapidly than can be effected by the reciprocating pawl-carrier and pawl.

7. In a trenching-machine, a body-frame; an excavating device supported for up-and-down movement; and a raising and lowering device supported upon the body-frame and connected with the excavating device by a yielding spring connection which permits the excavating device to move upwardly to a limited extent against the resistance of the spring and independently of the raising and lowering device.

8. In a trenching-machine, a wheeled carriage; an excavating device comprising a swinging ladder-frame and an endless belt trained over sprockets at opposite ends of the swinging ladder-frame and provided with devices for loosening and carrying up the soil; a vibratory and longitudinally-movable rack-bar supported upon the body-frame; a gear device for operating the rack-bar; a yielding spring connection between the rack-bar and the swinging ladder-frame comprising a slide to which the rack-bar is pivotally attached, and a spring arranged in opposition to the upward movement of the slide.

9. In a trenching-machine, a wheeled carriage provided with an engine or motor and having its body-frame extended longitudinally back of its rear supporting-wheels to form an extension which shall overhang the end portion of a trench terminating at and extending back from a point in rear of said rear wheels; an excavating device comprising a swinging ladder-frame supporting an endless belt having devices for loosening and carrying up the soil and trained over sprockets at opposite ends of the swinging ladder-frame which is pivotally hung at its forward end upon the wheeled carriage in position to permit it to dip into the trench and allow said devices for loosening the soil to operate upon the end wall of such trench at a point back of the rear carriage-wheels; a raising and lowering device applied for effecting the upward and downward swing of the swinging ladder-frame and having a shifting connection with the rear end portion of said rear extension of the body-frame of the carriage at a point back of the rear carriage-wheels, and also connected with the swinging ladder-frame at a point back of the point at which the latter is hung and back of the rear carriage-wheels; and power-transmitting connection between the engine or motor and the said raising and lowering device.

10. In a trenching-machine, a carriage provided with front and rear wheels and having its body-frame constructed with lower and upper longitudinally-extending bars 1 and 2, and an extension A' projecting back of the rear wheels; an excavating device comprising a swinging ladder-frame hung upon the upper portion of the body-frame in rear of the rear axle, and provided with an endless belt trained over sprockets at opposite ends of the ladder-frame and carrying devices for loosening and elevating the soil; a swinging and longitudinally-movable rack-bar connected with the swinging ladder-frame; a pinion arranged at the rear end of the extension A' of the body-frame and engaging the said rack-bar; and power-actuated mechanism for operating said pinion.

11. In a trenching-machine, a body-frame; a swinging excavating device adapted for forming a trench; swinging and longitudinally-movable rack-bars connected with the swinging excavating device as a means for raising and lowering the latter; a transversely-arranged rotary shaft supported upon the body-frame and having pinions engaging said rack-bars; and a longitudinally-arranged rotary shaft supported upon the body-frame and having a worm-gear connection with the said transversely-arranged rotary shaft.

12. In a trenching-machine, a carriage provided with an engine or motor; a swinging excavating device adapted for forming a trench and comprising a swinging ladder-frame and an endless belt trained over sprockets at opposite ends of the swinging ladder-frame and having devices for loosening and carrying up the soil; a transversely-arranged rotary shaft 15 supporting the sprockets for said belt at the forward end of the swinging ladder-frame; a transversely-arranged rotary shaft 21 positioned forward of the rotary shaft 15; a train of gearing connecting these two rotary shafts with the engine or motor; a transversely-arranged endless belt or apron arranged to receive loose soil from the excavating device and positioned for side delivery; and reversible power-transmitting connection between the said transversely-arranged belt and the rotary shaft 21.

13. In a trenching-machine, a carriage; an excavating device adapted for forming a trench; a longitudinally-adjustable belt-supporting frame supported upon and arranged for longitudinal adjustment transverse to the length of the carriage whereby delivery from the belt can be effected at either side of the carriage; an endless soil-carrying belt supported upon said adjustable frame and receiving the loose soil from the excavating device; an engine or motor on the carriage; and reversible power-transmitting connection between the engine or motor and the said endless soil-carrying belt.

14. In a trenching-machine, an excavating device adapted for forming a trench; a device for raising and lowering the excavating device; an endless soil-carrying belt which receives loose soil from the excavating device and which is arranged for side delivery; a reversibly-rotative shaft connected with the raising and lowering device by suitable power-transmitting connection; a power-driven gear 37; normally loose gears 38 and 39 engaging the gear 37; a right-and-left clutch device for locking the gears 38 and 39 to said reversibly-rotative shaft in alternation; sprockets 43 and 44 respectively operated by the gears 38 and 39; sprockets 48 and 42 secured to a belt-roll for the carrier-belt; and a chain 45 for establishing connection between sprockets 43 and 48, and in alternation therewith connection between sprockets 44 and 49.

15. In a trenching-machine, an excavating device adapted for forming a trench; a raising and lowering device for elevating and depressing the excavating device; an endless soil-carrying belt positioned to receive loose soil from the excavating device and arranged for side delivery; mechanism for continuously and simultaneously actuating both the excavating device and the soil-carrying belt which receives loose soil from such excavating device; mechanism for reversing the motion of the soil-carrying belt; mechanism for operating the raising and lowering device; and a clutch device for connecting and disconnecting the mechanism which actuates the raising and lowering device with and from the continuously-operating mechanism employed to drive the soil-carrying belt, and for causing the raising and lowering device to operate for either raising or lowering the excavating device at will.

16. In a trenching-machine, an excavating device adapted for forming a trench; an endless soil-carrying belt arranged for side delivery and adapted to receive loose soil from the excavating device; an adjustable frame supporting the endless soil-carrying belt and adjustable toward opposite sides of the machine; a supporting-roll for said belt provided with a pair of sprockets; a pair of corresponding power-driven sprockets operating in different directions, and belt connection between one or the other of the latter with one or the other of the sprockets with which the belt-roll is provided.

17. In a trenching-machine, a carriage; an excavating device adapted for forming a trench; an endless soil-carrying belt positioned transversely to the length of the machine and positioned to receive loose soil from the excavating device and discharge the same; a longitudinally-adjustable frame supporting the endless soil-carrying belt and provided with a rack; and a pinion engaging said rack as a means for adjusting the belt-supporting frame in directions to permit the belt to discharge at opposite sides of the carriage in alternation.

18. In a trenching-machine, an excavating device adapted for forming a trench and comprising a swinging ladder-frame and an endless belt trained over sprockets at opposite ends of the swinging ladder-frame and constructed with two endless series of links each composed of a pair of side plates; transversely-arranged angle-plates provided with cutters, and having end plates or portions 71 attached to links of the two endless series; and rolls supported upon the end plates or portions 71 and arranged to traverse longitudinal bars of the swinging ladder-frame.

HANS J. BENTSON.

Witnesses:
CHARLES G. PAGE,
OTTILIE C. FREIBERG.